July 14, 1931.    A. J. KOEBEL    1,814,602
METHOD OF TREATING ORES
Filed March 8, 1928    2 Sheets-Sheet 1

INVENTOR.
Albert J. Koebel
BY
ATTORNEY

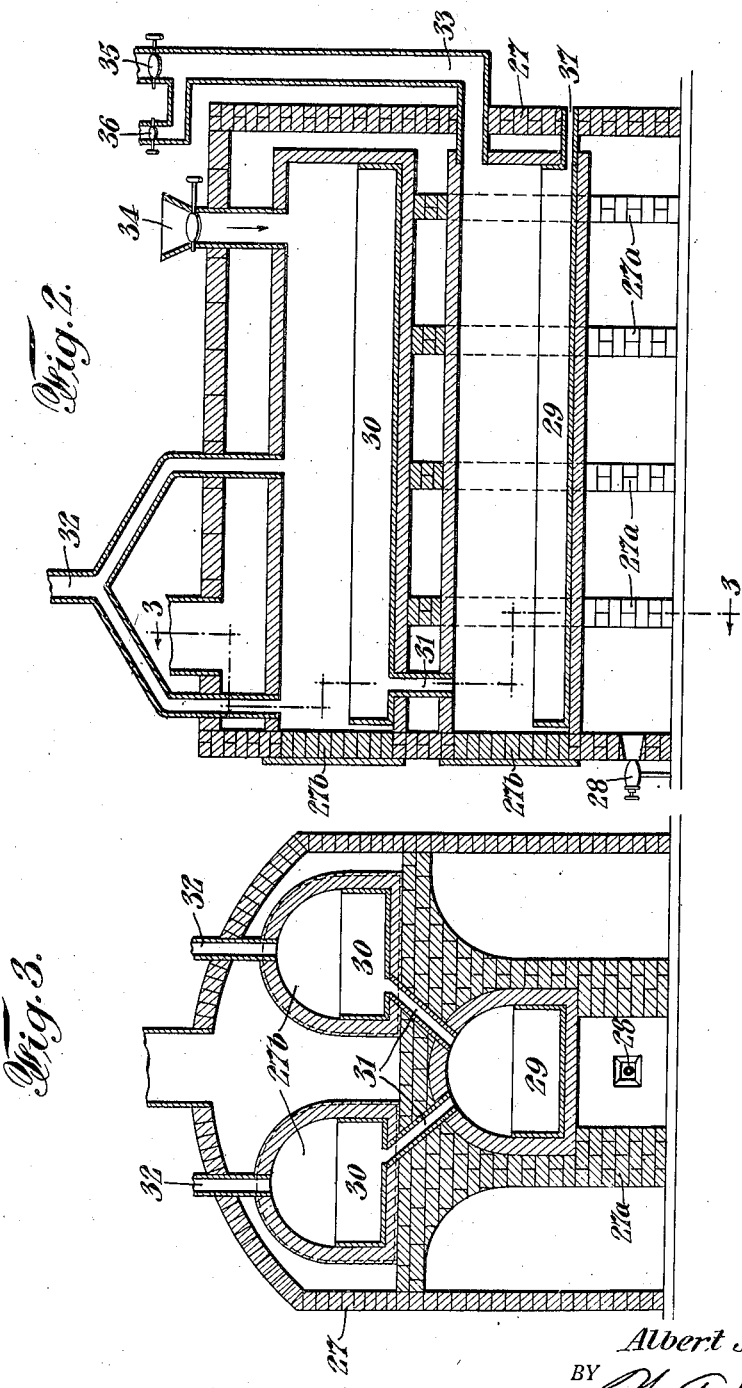

Patented July 14, 1931

1,814,602

UNITED STATES PATENT OFFICE

ALBERT J. KOEBEL, OF DAISY, WASHINGTON

METHOD OF TREATING ORES

Application filed March 8, 1928. Serial No. 260,230.

This invention relates to the reduction of ores and especially arsenical-pyrites ores containing arsenic, lead, zinc, and precious metals.

It is impossible to treat a great many arsenic ores and especially ores high in arsenic and pyrites content by any method of which I am aware with satisfactory recovery of the metals contained therein.

It is an object of this invention to provide a cheap, simple, and efficient method of reducing high arsenical-pyrites ores.

Another object of this invention is to simplify the treatment and reduce the hazard in the reduction of arsenic ores.

Another object of this invention is to provide means and a method of using the same whereby arsenic ores containing precious and non-precious metals may be reduced with minimum loss.

Another object of this invention is to provide means and a method of using the same whereby in arsenic ores containing precious and non-precious metals, the non-precious metals may be readily and cheaply separated from each other and the precious metals separated from all but one of the non-precious metals.

Other objects and advantages of this invention will become apparent from the following specification, claims and appended drawings, in which:—

Fig. 2 is a sectional view through the retort furnace used in my process.

Fig. 3 is a sectional view on the line 3—3 of Fig. 2.

The process which I employ for the separation of metals from the ore depends upon the volatilization in a furnace of the metals which it is desired to recover and drawing off these fumes thus separating the desired metals from the gang of the ore which may be converted into a fluid slag and trapped off. The volatilized metals may be in the oxide, the metallic state, or combined depending upon the condition under which the furnace is operated, and will hereinafter be referred to by the term metal fumes. The fumes are then precipitated with the exception of the sulphur by cooling thus eliminating and separating the sulphur which may be converted into an acid or discharged to the atmosphere. The precipitated metal fumes are subjected to heat in a specially constructed retort furnace and the arsenic and other readily volatile metals are driven off and separated by fractional sublimation and volatilization in the oxide or metallic state. The precious metals are left behind together with a carrier metal such as lead or copper or both and may be separated by any appropriate method.

Figure 1:
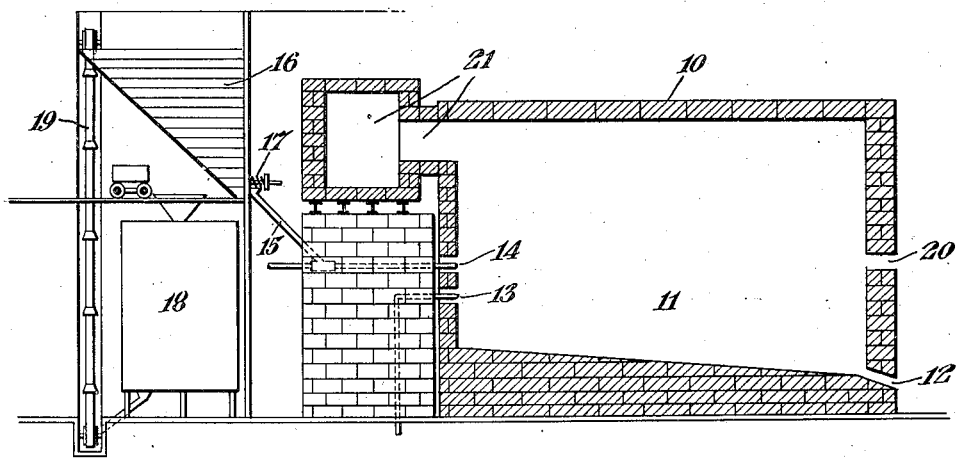
Fig. 1 is a view partly in section, showing the general layout of the volatilizing furnace, and preparation mechanism for the charge fed thereto as used in my improved process.

The apparatus employed in my process consists essentially of a volatilizing furnace, a baghouse, and a retort furnace. As shown in Fig. 1 the volatilizing furnace which I have designated by the numeral 10 is provided with a hearth portion 11 having a sloping bottom leading to a slag tap 12. At one end of the hearth inlet passages are provided one of which I have designated by the numeral 13. This inlet passage serves for the admission of fuel such as oil to the furnace and the other which I have designated by the numeral 14 serves for the admission of an air blast into which the charge of ore is fed through a chute 15 from a bin 16, as is clearly shown in Fig. 1. A worm feeder 17 is provided for controlling the discharge of the concentrated ore from the bin 16 to the chute 15.

The ore from the mine is first concentrated by any appropriate method and then dried in an appropriate dryer such as a Herreshoff dryer furnace 18, from which it is conveyed by appropriate means such as a chain and bucket elevator 19 to the concentrate bin 16. In the drawings I have shown the concentrate bin 16 as located above the dryer furnace 18 but do not wish to limit myself to this specific construction.

Figure 4:
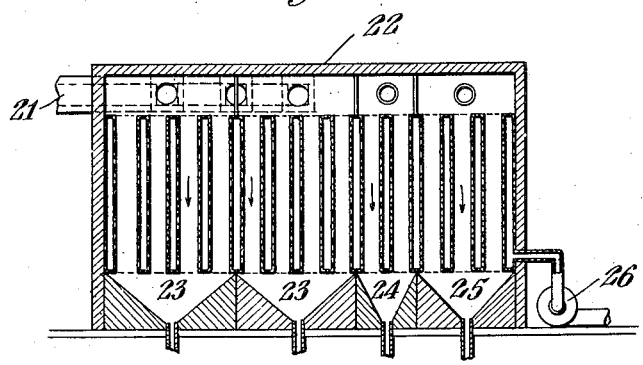
Fig. 4 is a diagrammatic view of the baghouse employed in my process.

The volatilizing furnace hearth 11 is of a closed type and is provided with peep hole 20 in one side thereof thru which the interior of the furnace may be viewed. From the top of the hearth a flue 21 leads to a baghouse which I have designated by the numeral 22 in Fig. 4. This baghouse is divided into three compartments designated respectively 23, 24 and 25. The flue 21 leads into the compartment 23 which is of substantially twice the dimensions of the other two compartments together. The baghouse is provided with bags preferably formed of woolen material although I do not wish to limit myself to this particular as I am aware that other materials may be used and is provided with bins below each compartment for collecting the material deposited on the bags.

A suction device such as a blower 26 is provided for exhausting air and other gases from around the bags thus drawing the metal fumes from the volatilizing furnace thru the flue 21 into the baghouse compartment 23 and filtering the same thru the bags into said compartment and discharging the remaining gaseous products either to the air or as will be hereinafter more fully described. The metal fumes from the volatilizing furnace in their travel thru the flue 21 will be cooled materially and will be still further cooled in the baghouse. This cooling will precipitate certain of the metal fumes while others will not be precipitated but will pass thru the bags and be discharged by the blower 26. As has previously been stated the metals in the fume may be in the conditions under which the volatilizing furnace is operated.

The precipitated metal fumes collected in the bins beneath the compartment 23 of the baghouse are treated in a retort furnace which forms an important part of my invention. This retort furnace comprises an outside shell 27 of masonry or other suitable material in the lower portion of which is located a suitable heating device such as oil burners 28, as shown in Figs. 2 and 3. The retort furnace is constructed to treat the precipitated metal fumes from the baghouse in two stages. To this end a lower hearth or iron pan 29 is provided in close proximity to the heating device where the same will be subjected to a relatively high temperature. Two upper hearths or iron pans which I have designated by the numeral 30 are provided at a more distant point from the source of heat and preferably at a higher level than the lower hearth 29. These upper hearths are provided with ducts 31 by means of which the contents thereof may be discharged into the lower hearth 29. The passage of the charge through the ducts 31 may be controlled by any suitable means such as clay plugs. Each of the hearths is incased in masonry or other suitable material and is provided with an outlet flue. Supporting walls or baffles 27a are provided for supporting the hearths 29 and 30 and allow free passage of gas therearound with the exception of the front end which is in common with the front wall of the furnace and is provided with suitable doors and dampers. The flue from the lower pan 29, I have designated by the numeral 33 while the flue from the upper pans 30 I have designated by the numeral 32. The upper retort hearths or pans 30 are provided with feeding means such as a feed hopper 34 thru which charges may be fed. The flue 33 from the lower pan 29 is provided with an outlet to the compartment 24 and also 25 of the baghouse. A damper 35 is provided to control the passage of gas from the lower pan 29 to the compartment 24 of the baghouse and a similar damper 36 is provided for controlling the passage of said gases to the compartment 25 of the said baghouse. The flues 32 connect the upper hearths 30 with the compartment 25 of the baghouse and if desired suitable dampers may be provided for the control of the passage of gas thru these flues. The retort furnace is provided with suitable doors 27b for permitting entrance to and inspection of the retorts 29 and 30 and also for the charging of materials thereto if desired and for controlling the admission of air. A tap 37 is provided for drawing off material from the lower hearth or iron pan 29, as is clearly shown in Fig. 2.

The hereinbefore described apparatus and the method of using the same has been devised primarily for the treatment of arsenical-pyrites ore containing silver, lead, zinc, copper, gold, and arsenic but I do not desire to limit myself to the treatment of any specific ore. The ore from the mines is first concentrated by any known and appropriate method to remove part of the gang and is then fed to a Herreshoff dryer furnace as shown in Fig. 1 where it is dried. The concentrated ore is then conveyed to a bin designated by the numeral 16 in Fig. 1 by an appropriate conveying apparatus such as a chain and bucket elevator 19. From this bin the ore is discharged by a control worm feeder to a chute 15 which conducts the ore into an air blast passing into the volatilizing furnace. The air blast may be created by any appropriate means such as a blower and serves not only to carry the ore into the furnace but also to furnish air for the combustion of a fuel such as fuel oil entering the volatilizing furnace adjacent the air blast through an inlet passage 13. The sulphur in the ore also furnishes a source of heat and in high pyrites ores is often a sufficient source of heat so that the feeding of other fuel may be discontinued once the furnace has been brought into operation. Under the heat within the furnace the metals of the ore are converted into metal fumes and are drawn off thru the flue 21 to the compartment 23 of the baghouse by the suction blower 26. The metal fumes will, of course, cool in their passage thru the flue 21 and also in the baghouse compartment 23. The cooling in the baghouse is sufficient to precipitate the metal fumes with the exception of the sulphur, in solid form either on the bags in the baghouse or in the bins therebelow. The bags in the baghouse are from time to time subject to shaking by hand or by appropriate devices thus removing the oxides from the surface thereof and permitting the same to collect in the bins below the bags.

The cooling effect is insufficient to precipitate the sulphurous oxides and the same are exhausted through the blower 26 either to the air or appropriate mechanism wherein they are converted to sulphur acids such as sulphuric or sulphurus acids. The bins at the bottom of the compartment 23 of the baghouse will now contain an accumulation of the metal fumes of the various metals. This accumulation of metal fumes is next subject to treatment in my improved retort furnace shown in Figs. 2 and 3 in order to separate the various metals from each other and to recover the precious metals preferably together with one of the non-precious metals in metallic form.

The accumulation of metal fumes from the bins at the bottom of the compartment 23 of the baghouse, to which may be added the precipitated fume collecting in the flue 21, is charged thru a feed hopper into the upper iron pans or hearths 30 of the retort furnace where the charge is subject to a relatively low temperature causing a fractional sublimation separation of the arsenic. The arsenic passing off in the oxide form is conducted thru the flues 32 to the compartment 25 of the baghouse where the same is cooled and precipitated a finished product. The suction blower 26 creates suction in all sections of the baghouse and therefore draws the arsenic vapors from the upper retort pans or hearth 30 into the compartment 25 of the baghouse. When the volatilizing furnace is run to produce the metals in the metallic state in the fume the heat in the retort pans 30 is sufficient to melt the charge and the remaining charge after the arsenic has been driven off is now transferred to the lower retort pan 29 thru the ducts 31. In the lower pan any remaining arsenic is driven off and conducted thru the flue 33 to the compartment 25 of the baghouse by the appropriate opening and closing of the dampers 35, 36.

Another method which has been found very applicable consists in raising the temperature of the liquid products in the lower pan to the volatilization temperature of zinc admitting a sufficiency of air to combine with the zinc vapors driven off to form zinc oxide. By proper positioning of the dampers 35, 36 this zinc oxide is drawn into the compartment 24, of the baghouse by the suction blower 26 and collected in the bin at the bottom of this compartment. After the zinc has been driven off the remaining metals may be drawn off thru tap opening 37 in the molten state and treated by many known methods for the separation of these metals from each other.

When the volatilizing furnace is operated to produce the metal fume in the oxide form reducing agents such as charcoal must of course be added to the retort. I find that the exact time of such addition is not vital as long as the reducing agents are added in time to permit reduction of the charge other than arsenic to a flowing condition in the upper pan. Sufficient reducing agents may be added to the upper retort pans to completely reduce the charge with the exception of the arsenic which is removed by volatilizing or further reducing agents may be added in the lower pan to reduce the charge of the metallic state. The adding of reducing agents as needed is well within the ability of any person skilled in the art. It is also obvious that the zinc may be removed from the lower pan in the metallic vapor form by heating the liquid products in the lower pan to the volatilization temperature of zinc in the absence of air. The vapors may be condensed as metallic zinc by methods well-known in the art.

The process is substantially continuous and is especially adapted for the treatment of ores high in arsenic and pyrites. This process is suitable for the separation of volatile metals which do not sublimate as well as those that do and I do not wish to limit myself to the separation of only zinc, arsenic, and lead by this method for it is obvious that additional compartments may be added to the baghouse and other volatile metals separated by volatilization under controlled temperatures either in their metallic state or oxide forms.

Various changes in the construction of the embodiment illustrated in the drawings may be made without departing from the spirit of the invention, and I do not therefore desire to limit myself to the specific construction shown and described, but to interpret the invention broadly within the scope of the appended claim.

What I claim as my invention is:

A method of treating arsenical pyrites ores containing lead, zinc, silver, and gold, which includes injecting the ore in finely divided form in a furnace, subjecting the ore to the action of a flame while the ore is in suspension in the furnace to drive off said metals in the form of a fume, collecting and precipitating the volatilized products of the said metals driven off, separating said products by fractional volatilization by heating said products to the volatilizing temperature of arsenic oxide and driving off the arsenic oxide, then adding a reducing agent, and raising the temperature to the volatilizing temperature of zinc and driving off the zinc, and then drawing off the remainder containing the lead, silver, and gold.

In testimony whereof I affix my signature.

ALBERT J. KOEBEL.